United States Patent [19]

Gudat et al.

[11] 4,072,364
[45] Feb. 7, 1978

[54] COMPENSATING CIRCUIT ARRANGEMENT IN A WHEEL ANTI-SKID BRAKE CONTROL SYSTEM TO OBTAIN CORRESPONDING MEASURED VALUES OF THE DURATION OF THE HALF CYCLE ALTERNATIONS OF A WHEEL GENERATED VOLTAGE

[75] Inventors: Wolfgang Gudat; Gerhard Ruhnau, both of Hannover, Germany

[73] Assignee: WABCO Westinghouse GmbH, Hannover, Germany

[21] Appl. No.: 733,424

[22] Filed: Oct. 18, 1976

[30] Foreign Application Priority Data

Nov. 29, 1975 Germany .............................. 2553806

[51] Int. Cl.² .............................................. B60T 8/02
[52] U.S. Cl. ..................................... 303/95; 324/160; 361/240; 364/424
[58] Field of Search .............................. 303/95, 96, 99; 235/151.32, 150.2; 361/236, 240; 324/160, 166, 78 D; 307/233 R

[56] References Cited

U.S. PATENT DOCUMENTS

| | | | |
|---|---|---|---|
| 3,757,167 | 9/1973 | Yoshikawa | 324/160 |
| 3,937,525 | 2/1976 | Luhdorff | 235/150.2 |

*Primary Examiner*—Trygve M. Blix
*Assistant Examiner*—Reinhard J. Eisenzopf
*Attorney, Agent, or Firm*—R. W. McIntire, Jr.

[57] ABSTRACT

In an anti-skid brake control system for a wheeled vehicle, an electronic circuit for generating a wheel speed signal in accordance with the time duration of a half cycle of a sinusoidal waveform generated by a sensor that detects the presence or absence of teeth of a rotor that revolves with a wheel of the vehicle is arranged so that the measured time duration of both a positive and a negative alternation of the waveform is utilized to obtain accurate wheel skid control at relatively low speeds. Slight differences in the measured time duration of a positive and negative half cycle due to slight variations in the dimensions of a tooth and adjacent space are sensed and modified as required to assure correspondence between the measured time durations in order to avoid false sensing of a wheel skid condition.

8 Claims, 1 Drawing Figure

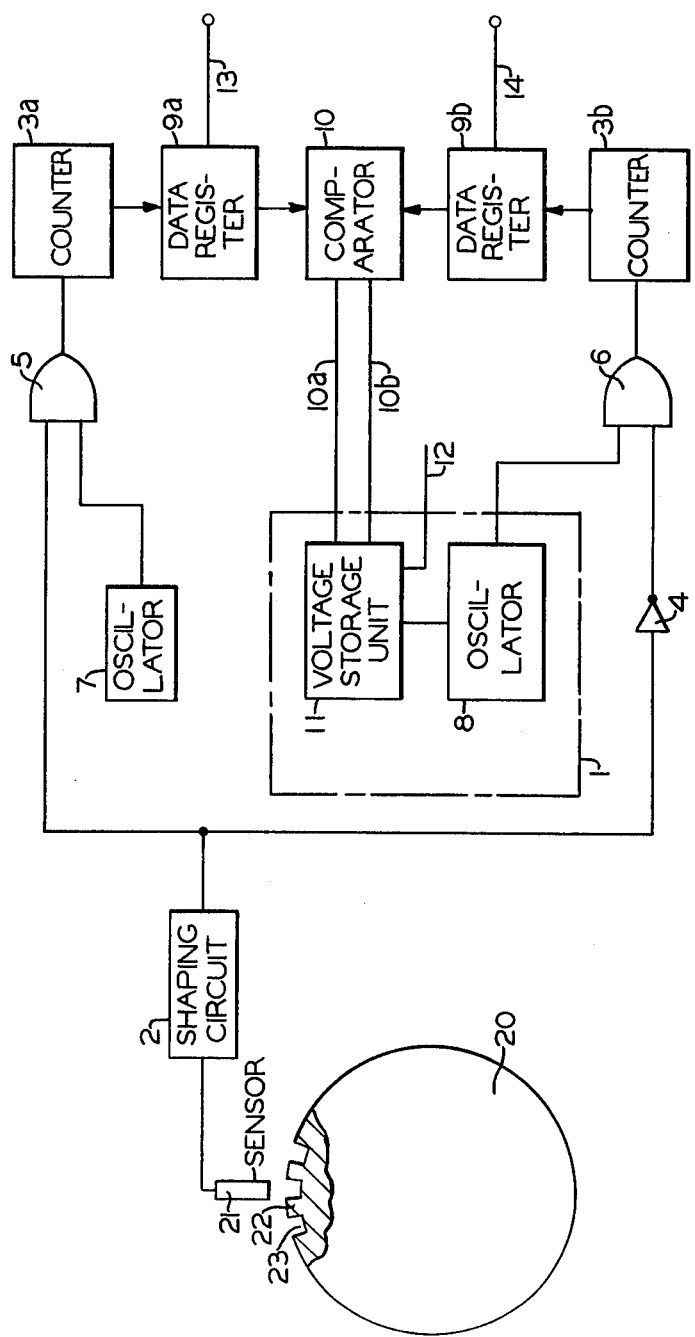

COMPENSATING CIRCUIT ARRANGEMENT IN A WHEEL ANTI-SKID BRAKE CONTROL SYSTEM TO OBTAIN CORRESPONDING MEASURED VALUES OF THE DURATION OF THE HALF CYCLE ALTERNATIONS OF A WHEEL GENERATED VOLTAGE

BACKGROUND OF THE INVENTION

The present invention relates to apparatus for measuring vehicle wheel speeds in accordance with digital values measured within the time duration of the cycles of an alternating voltage created by a toothed rotor of the vehicle wheel passing in proximity with a wheel speed sensor, which may be of the magnetic pick-up type.

Such wheel speed measuring apparatus is used in conjunction with anti-skid brake control systems for preventing the occurrence of an inadmissible slip of the vehicle wheel.

Presently, only the successive full cycles or only the positive or negative half cycles of the alternating voltage are used for measuring the relative time durations of the full or half cycles, since in actual practice the rotor member cannot be manufactured economically and still maintain dimensional accuracy between the teeth and the spaces between the teeth of the rotor. If a tooth and successive space were sensed at a constant wheel speed, any dimensional differences therebetween would result in a different measured value and consequently a false indication of a wheel speed change.

In avoiding this false indication of wheel speed change, however, by sensing only successive full cycles corresponding to the passing of a tooth and successive tooth space or only the positive or negative half cycles corresponding to the passing of each tooth or each space, respectively, it becomes apparent that information gaps exist, since only 50% of the duty cycle of the alternating voltage generated is used, thus limiting wheel skid control at low speeds.

SUMMARY OF THE INVENTION

The object of the invention is to provide an arrangement in which variations in the width of a rotor tooth and a successive space is compensated automatically to permit both the positive and negative half cycles of an alternating voltage of a wheel speed sensor associated with the rotor to be utilized in order to obtain information of the dynamic condition of the wheel for purposes of wheel skid control at slower wheel speeds than otherwise possible.

Briefly, this objective is fulfilled by measuring the width of a tooth and successive tooth space of a rotor member that turns with a wheel of the vehicle. The measuring is accomplished by counting clock pulses supplied via an AND gate that is enabled for a duration corresponding to the time required for a tooth or space to pass a wheel speed sensor whose output generates an alternating voltage. The pulses counted during a positive half cycle of the alternating voltage when a tooth is passing the wheel speed sensor are compared with the pulses counted during a negative half cycle when a tooth space passes the wheel speed sensor. A difference in the pulse count indicates a dimensional difference between the width of a tooth and tooth space. The comparator senses this difference and causes a compensating circuit to vary the rate of clock pulses generated during a preselected one of the positive or negative half cycles in such sense as to bring the pulse counts and consequently the measured values of a tooth and tooth space into correspondence irrespective of the differences in width between a tooth and successive tooth space.

Other objects and attendant advantages will be apparent from the following more detailed explanation, when taken with the accompanying single FIGURE drawing showing a block diagrammatic of conventional devices arranged in a preferred form of the invention.

DESCRIPTION AND OPERATION

A wheel speed sensor 21 is disposed in proximity with the circumference of a rotor member 20 associated with a vehicle wheel. The rotor circumference is formed with teeth 22 whose width may differ from the associated tooth spaces 23 due, for example, to manufacturing tolerances. Sensor 21 monitors the rotor teeth 22 during rotation and produces an alternating voltage whose frequency is a measure of the rate at which teeth 22 pass sensor 21, thus reflecting the rotational speed of the vehicle wheel with which the rotor is associated. Because of the differences between the teeth and spaces therebetween, the generated sine waveform will have positive and negative half cycles of different time duration. Sensor 21, as well as the other elements of the circuitry comprising the present invention to be hereinafter explained, are all conventional, well known and commercially available.

Interposed between a compensating circuit 1 and sensor 21 is a wave-shaping network 2 which converts the sine wave output generated by sensor 21 into a substantially square-shaped waveform of corresponding character.

The wheel speed signal provided in accordance with the waveform emerging from network 2 is connected to a pulse counter 3a via one input of an AND gate 5. The other input of AND gate 5 is connected to an oscillator 7 having a constant frequency pulsed output signal. AND gate 5 is enabled during positive half cycles of the speed signal waveform to pass the constant frequency pulsed output signal from oscillator 7 to pulse counter 3a.

The negative half cycles of the speed signal waveform are inverted by an amplifier 4 so as to enable an AND gate 6 to pass a variable frequency pulse output signal from a voltage responsive oscillator 8 of compensating circuit 1 to a pulse counter 3b.

A binary code signal representing the number of oscillator pulses passed to counter 3a by AND gate 5 is fed from counter 3a to a data register 9a where it is stored at the end of the positive half cycle of the speed signal waveform.

Similarly, a data register 14 stores the pulse count accumulated by counter 3b during the negative half cycle of the speed signal waveform.

Connected to a digital comparator 10 is the binary code signal stored in each data register 9a and 9b for the purpose of detecting a difference in the stored values of the pulse count during the positive and negative half cycles of the speed signal waveform.

Comparator 10 includes two outputs 10a and 10b connected to a voltage storage unit 11 of compensating circuit 1. When a difference exists between the binary code signals stored in the respective registers 13, 14, either output 10a or output 10b will influence voltage storage unit 11 to adjust the voltage level to which oscillator 8 is subject. The output frequency of oscillator 8 is increased or decreased as this voltage level is adjusted.

For example, if the positive half cycle of the speed signal waveform is longer in duration than the negative half cycle, more pulses will be counted by counter 3a than by counter 3b and the respective signal stored in register 13 will be greater than the stored signal in register 14, since the duration AND gates 5 and 6 are enabled is in the same proportion to each other as the width of a tooth 22 is to the width of a successive space 23. Consequently, voltage storage unit 11 will receive a signal via comparator output 10a. Voltage storage unit 11 may be a well known circuit that includes a capacitor (not shown) whose voltage potential is increased by the signal present at output 10a. Variable frequency oscillator 8 responds to the increased voltage potential to which the capacitor of voltage storage unit 11 is charged to in turn increase its output frequency. For the duration AND gate 6 is enabled, therefore, a greater number of pulses is counted by pulse counter 3b and stored in data register 9b. When the binary code signal of register 9b matches the code signal of register 9a, comparator 10 will terminate the signal at output 10a and the frequency of oscillator 8 will remain constant until a subsequent difference arises between the data stored in registers 9a and 9b, as detected by comparator 10.

In the event the positive half cycle of the speed signal waveform is shorter in duration than the negative half cycle, fewer pulses will be counted by counter 3a than by counter 3b. The resultant signal difference stored in data registers 13 and 14 is detected by comparator 10, which produces a signal at output 10b to cause the capacitor of voltage storage unit 11 to discharge. The frequency of oscillator 8 is accordingly reduced until the pulses counted for the duration AND gate 6 is enabled cause the signal stored in data register 9b to match the signal in register 9a. When this occurs, the signal at output 10b of comparator 10 disappears to terminate any further discharge of the capacitor of voltage storage unit 11.

It will be apparent from the foregoing that compensating circuit 1, including voltage storage unit 11 and variable frequency oscillator 8, operates to reduce any difference existing between the pulses counted during successive positive and negative half cycles of the speed signal waveform until the number of pulses counted are in correspondence.

An output 13 of data register 9a and an output 14 of data register 9b are connected to an electronic wheel anti-skid brake control system of a conventional type (not shown). Due to the above-explained correction process, the measured values of the positive and negative half cycles are regulated at a 1:1 ratio, thus providing at constant wheel speeds corresponding bits of digital information useful in the wheel skid detecting process. Accordingly, the system is able to derive information during each half cycle in order to function efficiently at substantially lower vehicle speeds than otherwise possible where only a single half cycle of information could be used.

The above-explained correction process normally ends after a short time, but is necessarily interrupted at the time of a brake application because of the wheel acceleration or deceleration creating considerable differences in the half cycle values of the speed signal waveform. A line 12 connected to voltage storage unit 11 is subject to fluid brake pressure in order to lock the voltage storage unit against further changes in the voltage supplied to variable frequency oscillator 8. Thus, when a brake application is made, variations in the time duration of successive half cycles of the waveform due to wheel acceleration or deceleration are prevented from affecting compensating circuit 1, which consequently maintains the correction established prior to the brake application.

Having now described the invention, what we claim as new and desire to secure by Letters Patent, is:

1. In an anti-skid brake control system for a wheeled vehicle, an electronic circuit for generating a wheel speed signal in accordance with the time duration of a half cycle of a sinusoidal waveform whose positive and negative alternations are provided by a sensor that detects the presence or absence of a tooth of a rotor that revolves with a wheel of the vehicle, said electronic circuit comprising:
    (a) timing means subject to said sinusoidal waveform for providing a time signal representative of the time duration of a respective one of said positive and negative alternations of said sinusoidal waveform;
    (b) comparator means for detecting a difference between said time signal of a positive alternation and said time signal of a negative alternation of said sinusoidal waveform; and
    (c) compensating means for regulating said timing means so as to modify said time signal corresponding to one of said positive and negative alternations of said sinusoidal waveform when said comparator means detects a difference therebetween, whereby said wheel speed signal generated during a positive half cycle and a negative half cycle of said sinusoidal waveform are in correspondence for any given velocity of wheel rotation.

2. The Electronic circuit recited in claim 1, wherein said timing means comprises:
    (a) first and second oscillator means for producing a pulsed signal at the respective outputs thereof;
    (b) first AND gate means enabled during said positive half cycle of said sinusoidal waveform for passing said pulsed output signal from said first oscillator means;
    (c) second AND gate means enabled during said negative half cycle of said sinusoidal waveform for passing said pulsed output signal from said second oscillator means; and
    (d) first and second counter means to which said pulsed output signal passed via said first and second AND gate means is connected respectively to provide said time signal representative of the time duration of said positive and said negative alternations of said sinusoidal waveform.

3. The electronic circuit recited in claim 2, wherein said timing means further comprises:
    (a) circuit means for converting said sinusoidal waveform into a square shaped alternating voltage waveform at the output thereof;
    (b) said first AND gate having one input connected to the output of said circuit means and another input connected to the output of said first oscillator means;
    (c) said second AND gate having one input connected to the output of said circuit means in parallel with the one input of said first AND gate and another input connected to the output of said second oscillator means; and (d) signal inverter means connected intermediate said circuit means and the one input of said second AND gate for inverting the polarity of said square shaped waveform thereat to enable said second AND gate during the negative half cycle of the sinusoidal waveform.

4. The electronic circuit as recited in claim 3, wherein:
   (a) said first oscillator means provides said pulsed signal at the output thereof at a predetermined frequency;
   (b) said second oscillator means provides said pulsed signal at the output thereof at a variable frequency; and
   (c) said compensating means comprises a voltage storage unit whose voltage potential is varied in response to operation of said comparator means when a difference exists between said time signals corresponding to the duration of said positive and negative alternations of said sinusoidal waveform, said second oscillator means being subject to said variable output voltage of said voltage storage unit to provide said variable frequency pulse signal thereof.

5. The electronic circuit recited in claim 4, wherein said first and second counter means comprises a first and second digital counter whose outputs provide said time signals in binary code form.

6. The electronic circuit recited in claim 5, further comprising a first digital register connected between said comparator means and said first counter means for storing said binary coded time signal representing the time duration of the positive half cycle of said sinusoidal waveform and a second digital register connected between said comparator means and said second counter means for storing said binary coded time signal representing the time duration of the negative half cycle of said sinusoidal waveform.

7. The electronic circuit recited in claim 6, wherein said comparator means is a digital comparator having first and second outputs connected to said voltage regulator, said first or second output being energized responsive to a difference between the binary coded time signals stored in said first and second registers to cause said voltage storage unit to increase or decrease its voltage potential depending upon which of said first and second registers is providing the greater time signal, so as to adjust said variable frequency pulse signal provided by said second oscillator in such sense as to cause said time signals to be in correspondence.

8. The electronic circuit recited in claim 4, further characterized in that said voltage storage unit is subject to a control signal for withholding further variation of the output voltage thereof whenever a brake application is made.

* * * * *